United States Patent [19]
Itoh et al.

[11] Patent Number: 5,856,399
[45] Date of Patent: *Jan. 5, 1999

[54] THERMOPLASTIC ELASTOMER COMPOSITION

[75] Inventors: Yuichi Itoh; Kyoko Kobayashi; Akira Uchiyama, all of Ichihara, Japan

[73] Assignee: Mitsui Petrochemical Industries, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 635,319

[22] Filed: Apr. 19, 1996

[30] Foreign Application Priority Data

Apr. 21, 1995 [JP] Japan ..................................... 7-097112

[51] Int. Cl.$^6$ ................................................... C08L 53/00
[52] U.S. Cl. ............................................................. 524/505
[58] Field of Search ............................................... 524/505

[56] References Cited

U.S. PATENT DOCUMENTS 4,130,535  12/1978  Coran et al. .................... 260/33.6 AQ
5,093,418   3/1992  Kinoshita et al. ........................ 525/64

FOREIGN PATENT DOCUMENTS 04520-89  10/1991  European Pat. Off. .
0634453    1/1995  European Pat. Off. .

OTHER PUBLICATIONS

Abstract of Jap. Laid–Open Pat. Publ. No. 2–300250 (Dec. 12, 1990).
Abstract of Jap. Laid–Open Pat. Publ. No. 63–289046 (Nov. 25, 1988).

Primary Examiner—Peter D. Mulcahy
Attorney, Agent, or Firm—Sherman and Shalloway

[57] ABSTRACT

The thermoplastic elastomer composition of the invention comprises a crystalline polyolefin resin (A), an olefin rubber (B), a hydrogenated styrene block copolymer (C), a softener (D), and optionally, a peroxide non-crosslinked type hydrocarbon rubber (E) in a specific amount of each, and has a gel content of not less than 97%. This composition may be mixed with a crystalline polyolefin resin. The thermoplastic elastomer composition has excellent moldability and is able to provide a molded product having excellent elastomeric properties, high resistance to permanent compression set and good appearance. In particular, a composition obtained by mixing this thermoplastic elastomer composition and a crystalline polyolefin resin shows excellent moldability.

6 Claims, No Drawings

THERMOPLASTIC ELASTOMER COMPOSITION

FIELD OF THE INVENTION

The present invention relates to a thermoplastic elastomer composition, and more particularly to an olefin thermoplastic elastomer composition having excellent moldability and capable of providing a molded product of good elastomeric properties.

BACKGROUND OF THE INVENTION

Because of lightweight properties and easy recycling of olefin thermoplastic elastomers, they have been widely used as elastomers of energy conservation type or resource conservation type, particularly as substitutes for vulcanized rubbers, in the fields of automobile parts, industrial machine parts, electric or electronic parts, building materials and the like.

However, conventional olefin thermoplastic elastomers have drawbacks of poorer elastomeric properties as compared with the vulcanized rubbers, and they have been eagerly desired to be improved in elastomeric properties.

In this connection, olefin thermoplastic elastomers increased in the degree of crosslinking, namely, "perfectly crosslinked olefin thermoplastic elastomers" (e.g., those described in Japanese Patent Publication No. 18448/1980), have been already proposed as the olefin thermoplastic elastomers having improved elastomeric properties.

Though the perfectly crosslinked olefin thermoplastic elastomers are superior to partially crosslinked olefin thermoplastic elastomers in the elastomeric properties, they have problems of poor moldability and bad appearance of its molded product, resulting in limitation on their usage.

The present inventors have earnestly studied to solve such problems as mentioned above, and they have found that a thermoplastic elastomer composition having excellent moldability and capable of providing a molded product of excellent elastomeric properties and good appearance can be obtained by using a specific styrene block copolymer in a specific amount together with materials of the thermoplastic elastomer. Based on this finding, the present invention has been accomplished.

OBJECT OF THE INVENTION

The present invention is intended to solve such problems associated with the prior art as described above, and it is an object of the invention to provide a thermoplastic elastomer composition having excellent moldability and capable of providing a molded product of excellent elastomeric properties and good appearance.

SUMMARY OF THE INVENTION

A thermoplastic elastomer composition according to the invention comprises:

[I] a crystalline polyolefin resin (A) in an amount of 10 to 50 parts by weight,

[II] an olefin rubber (B) in an amount of 20 to 60 parts by weight,

[III] a styrene block copolymer (C) in an amount of 5 to 25 parts by weight, said copolymer (C) comprising a polymer block of styrene or its derivative (c-1) and a polymer or copolymer block (c-2) which is an isoprene polymer block, a butadiene polymer block or an isoprene-butadiene copolymer block and in which not less than 97% of unsaturated bonds are hydrogenated, and

[IV] a softener (D) in an amount of 5 to 40 parts by weight, the total amount of said components (A), (B), (C) and (D) being 100 parts by weight; and has a gel content of not less than 97%.

The thermoplastic elastomer composition is preferably a thermoplastic elastomer composition obtained by dynamically heat-treating, in the presence of an organic peroxide, a mixture comprising:

[I] a crystalline polyolefin resin (A) in an amount of 10 to 50 parts by weight,

[II] an olefin rubber (B) in an amount of 20 to 60 parts by weight,

[III] a styrene block copolymer (C) in an amount of 5 to 25 parts by weight, said copolymer (C) comprising a polymer block of styrene or its derivative (c-1) and a polymer or copolymer block (c-2) which is an isoprene polymer block, a butadiene polymer block or an isoprene-butadiene copolymer block and in which not less than 97% of unsaturated bonds are hydrogenated, and

[IV] a softener (D) in an amount of 5 to 40 parts by weight, the total amount of said components (A), (B), (C) and (D) being 100 parts by weight; and having a gel content of not less than 97%.

Examples of the styrene block copolymer (C) include the following styrene block copolymers (C1) and (C2).

(1) Styrene block copolymer (C1) comprising:

a polymer block of styrene or its derivative (c-1), and a polymer or copolymer block (c-2-1) which is an isoprene polymer block or an isoprene-butadiene copolymer block and in which the total content of 1,2-bonds and 3,4-bonds in an isoprene polymer portion is not less than 40%, and not less than 97% of unsaturated bonds are hydrogenated.

(2) Styrene block copolymer (C2) comprising:

a polymer block of styrene or its derivative (c-1), and a polymer or copolymer block (c-2-2) which is an isoprene polymer block, a butadiene polymer block or an isoprene-butadiene copolymer block and in which the total content of 1,2-bonds and 3,4-bonds in polymer portion thereof is not more than 30%, and not less than 97% of unsaturated bonds are hydrogenated.

The thermoplastic elastomer composition may further comprise a peroxide non-crosslinked type hydrocarbon rubber (E) in an amount of 1 to 20 parts by weight based on 100 parts by weight of the total amount of the crystalline polyolefin resin (A), the olefin rubber (B), the styrene block copolymer (C), the softener (D) and the peroxide non-crosslinked type hydrocarbon rubber (E).

The thermoplastic elastomer composition of the invention may be blended with a crystalline polyolefin resin such as the above-mentioned crystalline polyolefin resin (A) in an amount of 5 to 200 parts by weight based on 100 parts by weight of the thermoplastic elastomer composition.

DETAILED DESCRIPTION OF THE INVENTION

A thermoplastic elastomer composition according to the invention is described in detail hereinafter.

The thermoplastic elastomer composition of the invention is a thermoplastic elastomer composition of perfectly crosslinked type. This composition comprises a crystalline polyolefin resin (A), an olefin rubber (B), a styrene block copolymer (C), a softener (D), and optionally, a peroxide non-crosslinked type hydrocarbon rubber (E), and has a specific gel content.

Crystalline polyolefin resin (A)

The crystalline polyolefin resin (A) used in the invention is, for example, a homopolymer of an α-olefin of 2 to 20 carbon atoms or a copolymer thereof.

Examples of the crystalline polyolefin resin (A) include the following (co)polymers (1) to (9):

(1) an ethylene homopolymer (prepared by a low-pressure process or a high-pressure process), (2) a copolymer of ethylene and not more than 10% by mol of other α-olefin or a vinyl monomer such as vinyl acetate or ethyl acrylate, (3) a propylene homopolymer, (4) a random copolymer of propylene and not more than 10% by mol of other α-olefin, (5) a block copolymer of propylene and not more than 30% by mol of other α-olefin, (6) a 1-butene homopolymer, (7) a random copolymer of 1-butene and not more than 10% by mol of other α-olefin, (8) a 4-methyl-1-pentene homopolymer, and (9) a random copolymer of 4-methyl-1-pentene and not more than 20% by mol of other α-olefin.

Examples of the α-olefins include ethylene, propylene, 1-butene, 4-methyl-l-pentene, 1-hexene and 1-octene.

Of the above crystalline polyolefin resins, particularly preferred are the propylene homopolymer, the random copolymer of propylene and not more than 10% by mol of other α-olefin, and the block copolymer of propylene and not more than 30% by mol of other α-olefin.

The crystalline polyolefin resins (A) mentioned above may be used singly or in combination.

The crystalline polyolefin resin (A) has a melt flow rate (MFR, ASTM D 1238, 230° C., load of 2.16 kg) of 0.1 to 100 g/10 min, preferably 0.3 to 60 g/10 min.

Further, the crystalline polyolefin resin (A) has a crystallinity, as measured by X-ray diffractometry, of usually 5 to 100%, preferably 20 to 80%.

In the present invention, the crystalline polyolefin resin (A) is used in an amount of 10 to 50 parts by weight, preferably 10 to 45 parts by weight, more preferably 12 to 42 parts by weight, based on 100 parts by weight of the total amount of the crystalline polyolefin resin (A), the olefin rubber (B), the styrene block copolymer (C), the softener (D) and the peroxide non-crosslinked type hydrocarbon rubber (E). The peroxide non-crosslinked type hydrocarbon rubber (E) is an arbitrary component, so that the amount of the component (E) may become 0 part by weight.

Olefin rubber (B)

The olefin rubber (B) used in the invention is an amorphous, random, elastic copolymer comprising an α-olefin of 2 to 20 carbon atoms in an amount of not less than 50% by mol.

The amorphous random copolymer includes an amorphous α-olefin copolymer made from two or more kinds of α-olefins and an α-olefin-nonconjugated diene copolymer made from two or more kinds of α-olefins and a nonconjugated diene.

Examples of such copolymers include the following rubbers (1) to (4):

(1) an ethylene-α-olefin copolymer rubber
[ethylene/α-olefin (by mol)=about 90/10–50/50], (2) an ethylene-α-olefin-nonconjugated diene copolymer rubber
[ethylene/α-olefin (by mol)=about 90/10–50/50], (3) a propylene-α-olefin copolymer rubber
[propylene/α-olefin (by mol)=about 90/10–50/50], and (4) a butene-α-olefin copolymer rubber
[butene/α-olefin (by mol)=about 90/10–50/50].

Examples of the α-olefins used herein are identical with the above-exemplified a-olefins for constituting the crystalline polyolefin resin (A).

Examples of the nonconjugated dienes include dicyclopentadiene, 1,4-hexadiene, cyclooctadiene, methylene norbornene and ethylidene norbornene.

The ethylene-α-olefin-nonconjugated diene copolymer rubber (2) wherein the above-mentioned nonconjugated diene is copolymerized has an iodine value of preferably not more than 25.

Each of the copolymer rubbers (1) to (4) has a Mooney viscosity [$ML_{1+4}$(100° C.)] of 10 to 250, preferably 40 to 150.

Of the above copolymer rubbers (1) to (4), preferred is the ethylene-α-olefin-nonconjugated diene copolymer rubber (2).

The olefin rubber (B) used in the invention is preferably present in a highly crosslinked state.

In the present invention, the olefin rubber (B) is used in an amount of 20 to 60 parts by weight, preferably 25 to 60 parts by weight, more preferably 30 to 55 parts by weight, based on 100 parts by weight of the total amount of the crystalline polyolefin resin (A), the olefin rubber (B), the styrene block copolymer (C), the softener (D) and the peroxide non-crosslinked type hydrocarbon rubber (E).

Styrene block copolymer (C)

The styrene block copolymer (C) used in the invention is a hydrogenated block copolymer and comprises a polymer block of styrene or its derivative (c-1) and a block (c-2) composed of an isoprene polymer, a butadiene polymer or an isoprene-butadiene copolymer. In the block (c-2), not less than 97%, preferably not less than 98%, of unsaturated bonds are hydrogenated.

A polymer component for constituting the block (c-1) is styrene or its derivative.

Examples of the styrene derivatives include α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene and 4-(phenylbutyl)styrene. The polymer component for constituting the block (c-1) is preferably styrene or α-methylstyrene. Styrene or its derivatives mentioned above may be used singly or in combination.

In the styrene block copolymer (C), the proportion of the polymer block of styrene or its derivative (c-1) is in the range of preferably 10 to 50% by weight, more preferably 15 to 40% by weight.

The most preferred block structure of the styrene block copolymer (C) is a structure of "block (c-1)–block (c-2)–block (c-1)", but it is in no way limited thereto.

Examples of the styrene block copolymer (C) include the following styrene block copolymers (C1) and (C2).

(1) Styrene block copolymer (C1) comprising:

a polymer block of styrene or its derivative (c-1), and a polymer or copolymer block (c-2-1) which is an isoprene polymer block or an isoprene-butadiene copolymer block and in which the total content of 1,2-bonds and 3,4-bonds in polymer portion thereof is not less than 40%, and not less than 97% of unsaturated bonds are hydrogenated. (2) Styrene block copolymer (C2) comprising:

a polymer block of styrene or its derivative (c-1), and a polymer or copolymer block (c-2-2) which is an isoprene polymer block, a butadiene polymer block or an isoprene-butadiene copolymer block and in which the total content of 1,2-bonds and 3,4-bonds in an isoprene polymer portion is not more than 30%, and not less than 97% of unsaturated bonds are hydrogenated.

A polymer component for constituting the block (c-1) in the styrene block copolymers (C1) and (C2) is styrene or its derivative, and examples thereof are described hereinbefore.

In the styrene block copolymer (C1), the proportion of the polymer block of styrene or its derivative (c-1) is in the range of preferably 10 to 50% by weight, more preferably 10 to 45% by weight. That is, the proportion of the isoprene polymer block or the isoprene-butadiene copolymer block (c-2-1) is in the range of preferably 90 to 50% by weight, more preferably 90 to 55% by weight.

The most preferred block structure of the styrene block copolymer (C1) is a structure of "block (c-1)–block (c-2-1)–block (c-1)", but it is in no way limited thereto.

A polymer or a copolymer for constituting the block (c-2-2) in the styrene block copolymer (C2) is an isoprene polymer, a butadiene polymer or an isoprene-butadiene copolymer, and the total content of 1,2-bonds and 3,4-bonds in polymer portion thereof is not more than 30%, preferably not more than 25%.

In the styrene block copolymer (C2), the proportion of the polymer block of styrene or its derivative (c-1) is in the range of preferably 10 to 50% by weight, more preferably 10 to 45% by weight. That is, the proportion of the isoprene polymer block or the isoprene-butadiene copolymer block (c-2-2) is in the range of preferably 90 to 50% by weight, more preferably 90 to 55% by weight.

Of these examples, preferred is the styrene block copolymer (C2), particularly preferred is the styrene block copolymer (C2) comprising the polymer block of styrene or its derivative (C-1), the butadiene polymer block and the polymer block of styrene or its drivative.

The styrene block copolymer (C) used in the invention has a melt flow rate (MFR, ASTM D 1238, 230° C., load of 2.16 kg) of preferably not more than 20 g/10 min, more preferably not more than 10 g/10 min.

The styrene block copolymer (C) can be prepared by, for example, the processes described below.

In the first place, a non-hydrogenated styrene block copolymer is prepared by the following processes (1) to (3).

(1) Styrene or its derivative and isoprene, butadiene or an isoprene-butadiene mixture are successively polymerized using an alkyllithium compound as an initiator.

(2) Styrene or its derivative is polymerized, and then isoprene, butadiene or an isoprene-butadiene mixture is polymerized, followed by coupling using a coupling agent.

(3) Isoprene, butadiene or an isoprene-butadiene mixture and styrene or its derivative are successively polymerized using a dilithium compound as an initiator.

Details of the processes for preparing the block copolymer are described in, for example, Japanese Patent Laid-Open Publication No. 300250/1990.

In the next place, the styrene block copolymer obtained above is subjected to hydrogenation to obtain a hydrogenated block copolymer (C). The block to be hydrogenated is the isoprene polymer block, the butadiene polymer block or the isoprene-butadiene copolymer block (c-2).

In the present invention, the styrene block copolymer (C) is used in an amount of 5 to 25 parts by weight, preferably 10 to 25 parts by weight, more preferably 10 to 20 parts by weight, based on 100 parts by weight of the total amount of the crystalline polyolefin resin (A), the olefin rubber (B), the styrene block copolymer (C), the softener (D) and the peroxide non-crosslinked type hydrocarbon rubber (E).

Softener (D)

The softener (D) suitably used for the invention is a softener which is conventionally used for rubbers.

Examples of such softeners include:

petroleum type materials, such as process oil, lubricating oil, paraffin, liquid paraffin, petroleum asphalt and vaseline;

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids, such as ricinolic acid, palmitic acid and stearic acid, and metallic salts of these acids;

synthetic polymer materials, such as petroleum resin, coumarone-indene resin and atactic polypropylene;

ester type plasticizers, such as dioctyl phthalate, dioctyl adipate and dioctyl sebacate; and other softeners, such as microcrystalline wax, liquid polybutadiene or its modified or hydrogenated product, and liquid thiokol.

The softener (D) is used in an amount of 5 to 40 parts by weight, preferably 10 to 40 parts by weight, more preferably 10 to 35 parts by weight, based on 100 parts by weight of the total amount of the crystalline polyolefin resin (A), the olefin rubber (B), the styrene block copolymer (C), the softener (D) and the peroxide non-crosslinked type hydrocarbon rubber (E).

If the softener (D) is used in the above-mentioned amount, the resulting thermoplastic elastomer composition has high fluidity in the molding process and mechanical properties of its molded product are not lowered.

Peroxide non-crosslinked type hydrocarbon rubber (E)

The peroxide non-crosslinked type hydrocarbon rubber (E), that is optionally used in the invention, is a rubbery hydrocarbon material which is not crosslinked and is free from lowering of fluidity even when it is dynamically heat-treated in the presence of a peroxide (organic peroxide) at a temperature of not lower than the decomposition temperature of the peroxide.

Examples of such materials include a butyl rubber, a polyisobutylene rubber, and a propylene-ethylene copolymer rubber and a propylene-l-butene copolymer rubber each having a propylene content of not less than 50% by mol.

Of these, a butyl rubber or a polyisobutylene rubber is particularly preferably employed.

The peroxide non-crosslinked type hydrocarbon rubber (E) is used in an amount of 1 to 20 parts by weight, preferably 5 to 20 parts by weight, more preferably 10 to 20 parts by weight, based on 100 parts by weight of the total amount of the crystalline polyolefin resin (A), the olefin rubber (B), the styrene block copolymer (C), the softener (D) and the peroxide non-crosslinked type hydrocarbon rubber (E).

If the peroxide non-crosslinked type hydrocarbon rubber (E) is used in the above-mentioned amount, a thermoplastic elastomer composition having excellent moldability and capable of providing a molded product of good appearance can be obtained.

Other components

In the present invention, other additives such as heat stabilizer, antistatic agent, weathering stabilizer, anti-aging agent, filler, colorant and lubricant can be optionally added to the thermoplastic elastomer composition, within limits not prejudicial to the object of the invention.

Thermoplastic elastomer composition

A thermoplastic elastomer composition according to the invention comprises the crystalline polyolefin resin (A), the olefin rubber (B), the styrene block copolymer (C), the softener (D), and optionally, the peroxide non-crosslinked type hydrocarbon rubber (E) and additives, and has a gel content of not less than 97%, preferably 97 to 103%. In the invention, the gel content may exceed 100%, and it can be 110%.

The thermoplastic elastomer composition having a gel content within the above range has excellent moldability and can provide a molded product of excellent elastomer properties, high resistance to permanent compression set and good appearance.

In the thermoplastic elastomer composition, components highly crosslinked or perfectly crosslinked are the olefin rubber (B) and the styrene block copolymer (C). In the styrene block copolymer (C), the polymer block (c-2) participates in the crosslinking.

The gel content is measured in the following manner.

Measurement of gel content

Thermoplastic elastomer composition pellets (sample, size: 0.5 mm×0.5 mm×0.5 mm) of about 100 mg are weighed. In a closed vessel, the pellets are immersed in 30 ml (enough quantity for the pellets) of cyclohexane at 23° C. for 48 hours.

Then, the sample is placed on a filter paper and dried at room temperature for not shorter than 72 hours until a constant weight is reached.

From the weight of the dry residue, the weight of all cyclohexane-insoluble components other than a polymer component (e.g., filler, pigment, fibrous filler) and the weight of the crystalline polyolefin resin (A) in the sample before immersion in the cyclohexane are subtracted. The obtained value is taken as "corrected final weight (Y)".

Separately, the total weight of crosslinking components of the sample, that is, the olefin rubber (B) and the polymer block (c-2) for constituting the styrene block copolymer (C), {i.e., a value obtained by subtracting (1) the weight of a cyclohexane-soluble component other than olefin rubber (B) (e.g., the polymer block (c-1) such as styrene for constituting the styrene block copolymer (C), softener (D)), (2) the weight of the crystalline polyolefin resin (A), and (3) the weight of cyclohexane-insoluble component other than the polymer component (e.g., filler, pigment, fibrous filler) from the weight of the sample} is taken as "corrected initial weight (X)".

The gel content is determined by the following formula using the above-obtained values.

Gel content [%]=[(corrected final weight (Y)/(corrected initial weight (X)]×100

A preferred thermoplastic elastomer composition of the invention can be obtained by dynamically heat-treating a mixture of the crystalline polyolefin resin (A), the olefin rubber (B), the styrene block copolymer (C), the softener (D), and optionally, the peroxide non-crosslinked type hydrocarbon rubber (E) in the presence of an organic peroxide.

The terms "dynamically heat-treating" mean to knead in a molten state.

Examples of the organic peroxides used in the invention include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, preferred are 2,5-dimethyl-2,5-di-(tert-butylperoxy)hexane, 2,5-dimethyl-2,5-di-(tert-butylperoxy)hexyne-3 and 1,3-bis(tert-butylperoxyisopropyl)benzene from the viewpoints of odor and scorch stability. Among them, most preferred is 2,5-dimethyl-2,5-di-(tert-butylperoxy)hexane.

In the present invention, the organic peroxide is used in an amount of 0.6 to 2 parts by weight, preferably 0.8 to 1.6 parts by weight, based on 100 parts by weight of the total amount of the crystalline polyolefin resin (A), the olefin rubber (B), the styrene block copolymer (C), the softener (D) and the peroxide non-crosslinked type hydrocarbon rubber (E).

In the crosslinking treatment with the organic peroxide, there can be added peroxy crosslinking assistants, such as sulfur, p-quinone dioxime, p,p'-dibenzoylquinone dioxime, N-methyl-N-4-dinitrosoaniline, nitrosobenzene, diphenylguanidine and trimethylolpropnane-N,N'-m-phenylenedimaleimide; polyfunctional methacrylate monomers, such as divinylbenzene, triallyl cyanurate, ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl butyrate and vinyl stearate.

By the use of the above compounds, uniform and mild crosslinking reaction can be expected. Of the above compounds, divinylbenzene is most preferably used in the invention. Divinylbenzene can be easily handled and is compatible with the crystalline polyolefin resin (A) and the olefin rubber (B) both being major components of the object of the crosslinking treatment. Moreover, divinylbenzene has a function of solubilizing the organic peroxide and serves as a dispersant of the organic peroxide. Hence, a thermoplastic elastomer composition showing uniform crosslinking effects given by the heat treatment and well-balanced between fluidity and other properties can be obtained.

In the present invention, the crosslinking assistant or the polyfunctional monomer is used in an amount of 0.4 to 3% by weight, preferably 0.6 to 2% by weight, based on the amount of the whole object to be crosslinked. If the amount of the crosslinking assistant or the polyfunctional vinyl monomer is within the above range, the resulting thermoplastic elastomer composition does not remain in the elastomer composition as an unreacted monomer, and therefore the composition is free from change of properties caused by heat history in the molding process, and besides it has excellent fluidity.

The dynamic heat treatment is carried out using a mixing roll or an intensive mixer such as Banbury mixer, kneader, single-screw extruder or twin-screw extruder, and is preferably carried out in an apparatus of closed type. Further, the dynamic heat treatment is preferably performed in an atmosphere of inert gas such as nitrogen.

The temperature in the heat treatment is usually in the range of from a melting point of the polyolefin resin to 300° C., and the kneading time is preferably in the range of 1 to 10 min. The shear force applied is desirably in the range of 500 to 10,000 $sec^{-1}$ in terms of shear rate.

The thermoplastic elastomer composition obtained above may be mixed with a crystalline polyolefin resin, if necessary.

As the crystalline polyolefin resin used for the mixing, the aforesaid crystalline polyolefin resin (A) is preferred.

The crystalline polyolefin resin is used in an amount of preferably 5 to 200 parts by weight, more preferably 5 to 100 parts by weight, based on 100 parts by weight of the thermoplastic elastomer composition. When the crystalline polyolefin resin is used in the above-mentioned amount, the moldability can be improved. Moreover, the molded product obtained does not lose flexibility inherent in elastomers and is free from lowering of the elastomeric properties. In the present invention, therefore, the thermoplastic elastomer composition is preferably mixed with the crystalline polyolefin resin, prior to use.

For mixing the thermoplastic elastomer composition and the crystalline polyolefin resin, it is desired to perform a dynamic heat treatment in the aforesaid manner in the absence of an organic peroxide.

EFFECT OF THE INVENTION

A thermoplastic elastomer composition according to the invention comprises [I] the crystalline polyolefin resin (A), [II] the olefin rubber (B), [III] the hydrogenated styrene block copolymer (C) comprising a polymer block of styrene or its derivative (c-1) and an isoprene polymer block, a butadiene polymer block or an isoprene-butadiene copolymer block (c-2), [IV] the softener (D), and optionally, [V] the peroxide non-crosslinked type hydrocarbon rubber (E); and has a specific gel content. Therefore, this composition has excellent moldability and is able to provide a molded product of excellent elastomer properties, high resistance to permanent compression set and good appearance.

In particular, a composition obtained by mixing this thermoplastic elastomer composition and a polyolefin resin such as the crystalline polyolefin resin (A) in a specific mixing ratio shows excellent moldability.

EXAMPLE

The present invention will be further described with reference to the following examples, but it should be construed that the invention is in no way limited to those examples.

Described below are starting materials used in the following examples.

Crystalline polyolefin resin (A)
  (A-1) Propylene-ethylene block copolymer
    Melt flow rate (ASTM D 1238, 230° C., load of 2.16 kg, referred to as "MFR" hereinafter): 12 g/10 min
    Ethylene content: 10% by mol
  (A-2) Propylene homopolymer
    MFR: 8 g/10 min (A-3) Ethylene-l-butene copolymer
    MFR: 25 g/10 min
    1-Butene content: 7% by mol
Olefin rubber (B)
  (B-1) Ethylene-propylene-5-ethylidene-2-norbornene copolymer rubber
    Ethylene content: 78% by mol
    Iodine value: 12
    Mooney viscosity [$ML_{1+4}$ (100° C.)]: 120
Styrene block copolymer (C)
  (C-1) Hydrogenated product of styrene-butadiene-styrene block copolymer
    Styrene content: 30% by weight
    MFR (load of 10 kg): 0.3 g/10 min
    Hydrogenation ratio to unsaturated bonds in the butadiene polymer block: 99.8%
Softener (D)
  (D-1) Mineral oil type process oil (available from Idemitsu Kosan Co., Ltd., PW-380)
Peroxide non-crosslinked type hydrocarbon rubber (E)
  (E-1) Butyl rubber
    Degree of unsaturation: 0.7% by mol
    Mooney viscosity [$ML_{1+4}$ (100° C.)]: 45

Examples 1–4, Comparative Examples 1–5

The above-described materials in the amounts shown in Table 1 were blended and then kneaded at 180° C. for 5 minutes in a nitrogen atmosphere by means of a Banbury mixer. A kneadate obtained was passed through rolls to give a sheet, and the sheet was cut by a sheet cutter to prepare square pellets.

Then, the square pellets, divinylbenzene (referred to as "DVB" hereinafter) and 2,5-dimethyl-2,5-di-(t-butylperoxy) hexane (referred to as "POX" hereinafter) in the amounts shown in Table 1 were stirred by means of a Henschel mixer.

The mixture obtained above was extruded at 220° C. in a nitrogen atmosphere by means of a twin-screw extruder having L/D of 40 and a screw diameter of 50 mm and then dried for 3 hours in an oven maintained at 110° C., to obtain a thermoplastic elastomer composition.

A gel content of the thermoplastic elastomer composition was measured in the aforesaid manner.

The result is set forth in Table 1.

Further, the permanent compression set of the thermoplastic elastomer composition was measured as an index of elastomeric properties by the method of JIS K 6301 (compression temperature: 70° C., compression time: 22 hours).

The result is set forth in Table 1.

Furthermore, the moldability of the thermoplastic elastomer composition and the appearance of a molded product of the composition were evaluated in the following manner. A single-screw extruder having a screw diameter of 50 mm was equipped with a die (Garvey die) used in the method A of ASTM D 2230-90, and the thermoplastic elastomer composition was extrusion molded by the extruder under the following conditions to obtain a molded product.
Extrusion molding conditions
  Preset temperature: C1/C2/C3/C4/C5/H/D=160° C./180° C./200° C./220° C./220° C./220° C./200° C.
  Number of screw revolutions: 45 rpm
  Screen mesh: 40 mesh/80 mesh/40 mesh
  The appearance (surface, edge) of the molded product was evaluated by criteria described in ASTM D 2230-90. The moldability of the composition was evaluated by the appearance of the molded product.

The surface of the molded product was evaluated by five ranks of from A to E. The molded product of the best appearance (surface) is ranked as A, and the evaluation becomes lower in the order of B, C, D and E.

The edge of the molded product was evaluated by ten ranks of from 1 to 10. The molded product of the best appearance (edge) is ranked as 10, and the evaluation becomes lower in the order of 9, 8, 7, 6, 5, 4, 3, 2 and 1.

TABLE 1

|  | Ex. 1 | Ex. 2 | Ex. 3 | Ex. 4 |
|---|---|---|---|---|
| Starting material (part (s) by weight) Crystalline polyolefin resin |  |  |  |  |
| A-1 | 13 | 20 | — | — |
| A-2 | — | — | 23 | 27 |
| A-3 | — | — | 8 | — |
| Olefin rubber B-1 | 35 | 33 | 27 | 31 |
| Styrene block copolymer C-1 | 13 | 13 | 12 | 12 |
| Softener D-1 | 26 | 26 | 30 | 30 |
| Peroxide non-crosslinked type hydrocarbon rubber E-1 | 13 | 13 | — | — |
| POX | 1.2 | 1.0 | 1.0 | 1.0 |
| DVB | 1.0 | 0.8 | 0.8 | 0.8 |
| Gel content (%) | 99.5 | 99.2 | 98.9 | 99.2 |
| JIS A hardness | 55 | 73 | 85 | 87 |
| Permanent compression set (%) | 21 | 31 | 39 | 37 |
| Moldability, appearance of molded product |  |  |  |  |
| Surface | A | A | A | A |
| Edge | 8 | 10 | 8 | 9 |

|  | Comp. Ex. 1 | Comp. Ex. 2 | Comp. Ex. 3 | Comp. Ex. 4 | Comp. Ex. 5 |
|---|---|---|---|---|---|
| Starting material (part (s) by weight) Crystalline polyolefin resin |  |  |  |  |  |
| A-1 | 13 | — | 13 | 13 | — |
| A-2 | — | 23 | — | — | 27 |
| A-3 | — | 8 | — | — | — |
| Olefin rubber B-1 | 35 | 27 | 48 | 35 | 43 |
| Styrene block copolymer C-1 | 13 | 12 | — | — | — |
| Softener D-1 | 26 | 30 | 26 | 26 | 30 |
| Peroxide non-crosslinked type hydrocarbon rubber E-1 | 13 | — | 13 | 26 | — |
| POX | 0.4 | 0.4 | 1.2 | 1.2 | 1.0 |
| DVB | 0.4 | 0.4 | 1.0 | 1.0 | 0.8 |
| Gel content (%) | 96.1 | 95.8 | 99.6 | 99.4 | 99.3 |
| JIS A hardness | 54 | 84 | 59 | 52 | 89 |
| Permanent compression set (%) | 32 | 54 | 22 | 26 | 38 |
| Moldability, appearance of molded product |  |  |  |  |  |
| Surface | A | A | C | B | B |
| Edge | 8 | 9 | 4 | 6 | 5 |

What is claimed is:

1. A thermoplastic elastomer composition comprising:

a composition obtained by dynamically heat-treating, in the presence of an organic peroxide, a mixture consisting of:

(I) a crystalline polyolefin resin (A) in an amount of 10 to 50 parts by weight, (II) an olefin rubber (B) in an amount of 20 to 60 parts by weight, (III) a styrene block copolymer (C2) in an amount of 5 to 25 parts by weight, said copolymer (C2) comprising a polymer block (c-1) of styrene or its derivative and a polymer or copolymer block (c-2-2) which is an isoprene polymer block, a butadiene polymer block or an isoprene-butadiene copolymer block, wherein the total content of 1,2-bonds and 3,4-bonds in an isoprene polymer portion is not more than 30%, and not less than 97% of unsaturated bonds are hydrogenated, (IV) a softener (D) in an amount of 5 to 40 parts by weight, the total amount of said components (A), (B), (C2) and (D) being 100 parts by weight, (V) optionally, a peroxide non-crosslinked hydrocarbon rubber (E) in an amount of 1 to 20 parts by weight based on 100 parts by weight of the total amount of the crystalline polyolefin resin (A), the olefin rubber (B), the styrene block copolymer (C2), the softener (D) and the peroxide non-crosslinked hydrocarbon rubber (E), and (VI) optionally, at least one additive selected from the group consisting of heat stabilizer, antistatic agent, weathering stabilizer, anti-aging agent, filler, colorant and lubricant, and having a gel content of not less than 97%.

2. The thermoplastic elastomer composition as claimed in claim 1, wherein the crystalline polyolefin resin (A) contains a polypropylene resin in an amount of not less than 50% by weight.

3. The thermoplastic elastomer composition as claimed in claim 1 or claim 3, wherein the olefin rubber (B) is an ethylene-propylene-nonconjugated diene copolymer rubber.

4. The thermoplastic elastomer composition as claimed in claim 1, wherein the peroxide non-crosslinked hydrocarbon rubber (E) is a butyl rubber or polyisobutylene.

5. The thermoplastic elastomer composition as claimed in claim 1, wherein the organic peroxide is used in an amount of 0.6 to 2.0 parts by weight based on 100 parts by weight of the total amount of the crystalline polyolefin resin (A), the olefin rubber (B), the styrene block copolymer (C2), the softener (D) and the peroxide non-crosslinked hydrocarbon rubber (E).

6. A thermoplastic elastomer composition comprising:

the thermoplastic elastomer composition, as claimed in claim 1, in an amount of 100 parts by weight; and a crystalline polyolefin resin in an amount of 5 to 200 parts by weight.

* * * * *